United States Patent [19]

Shallbetter

[11] 3,753,047

[45] Aug. 14, 1973

[54] TAMPER-PROOF ELECTRIC POWER DISTRIBUTION AND METER ENCLOSURE SYSTEM

[76] Inventor: Albert J. Shallbetter, 15 Kaiser Ave. N., Minneapolis, Minn. 55427

[22] Filed: Aug. 20, 1971

[21] Appl. No.: 173,365

[52] U.S. Cl.................... 317/107, 317/111, 174/60
[51] Int. Cl. ............................................. H02b 9/00
[58] Field of Search...................... 174/38, 45 R, 60; 317/104, 105, 107–111, 120

[56] References Cited
UNITED STATES PATENTS

| | | | |
|---|---|---|---|
| 3,450,951 | 6/1969 | Boyle | 317/105 |
| 3,142,001 | 7/1964 | Spencer | 317/105 |
| 2,323,252 | 6/1943 | Sparkes | 317/111 |
| 2,626,309 | 1/1953 | Road | 317/108 |

Primary Examiner—Robert K. Schaefer
Assistant Examiner—Gerald P. Tolin
Attorney—Orrin A. Haugen

[57] ABSTRACT

An electric power meter and distribution box suitable for use in mobile home parks and similar outdoor applications in which underground wiring is brought up through a vertical hollow stand pipe to which is affixed a base member by means of first and second pairs of set screws. The base member is adapted to support an enclosure in which is located one or more duplex receptacles, a set of circuit breakers, an electrical watt-hour meter, as well as any other similar type of power receptacles. The first pair of set screws is located external to the enclosure whereas the second pair of set screws is located within the enclosure. A hinged cover member, which may be locked, is provided to prevent unauthorized access or tampering with the electrical components.

3 Claims, 2 Drawing Figures

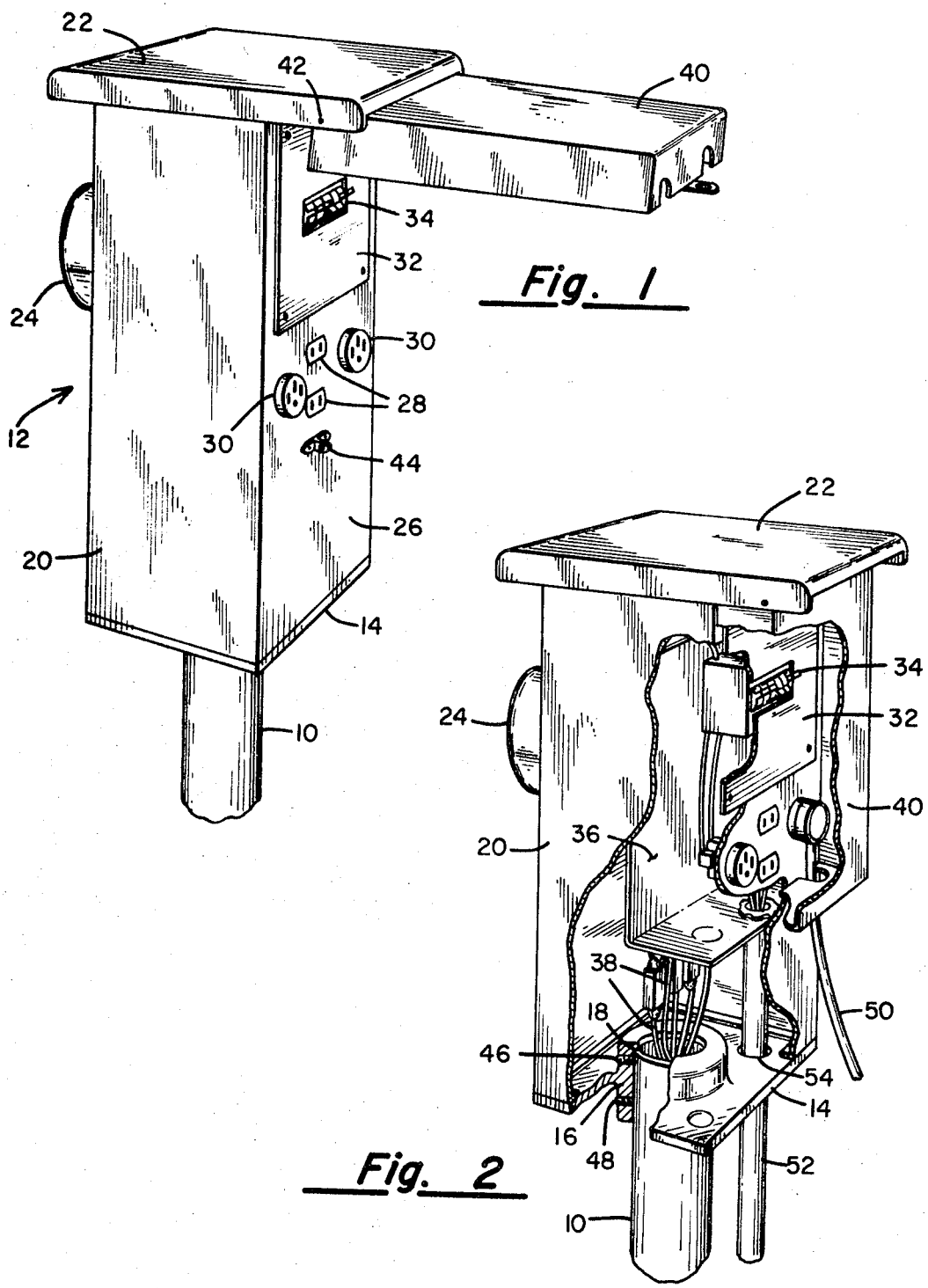

3,753,047

TAMPER-PROOF ELECTRIC POWER DISTRIBUTION AND METER ENCLOSURE SYSTEM

BACKGROUND OF THE INVENTION

This invention relates to electrical distribution boxes and more specifically to a power distribution panel especially designed for use out-of-doors, such as in mobile home parks, marinas, parking lots, and the like. As such, it is essential that the unit be weather-proof, tamper-proof and easy to install.

The closest prior art believed to be pertinent to the present invention is set forth in the Boyle U.S. Pat. No. 3,450,951 which discloses an outdoor electrical meter box and service outlet adapted to be mounted on a hollow post through which electrical power lines may pass into the meter and distribution panel. Further, the Boyle patent discloses a tamper-proof mechanical connection between the meter box and the support post to resist theft and vandalism. The present invention is an improvement over the apparatus described in the afore-mentioned Boyle patent in that the mounting arrangement is greatly simplified while still retaining the anti-theft feature and isolation of the power lead-in connections and the load connections.

Specifically, in accordance with the teachings of the present invention, a rectangular box-like sheet metal enclosure is secured to a cast aluminum base plate having integrally formed therein a tubular segment of a predetermined inside diameter which terminates in a shoulder of a slightly reduced diameter. The tubular segment projects from both sides of the base plate and has a plurality of tapped holes extending transversely through the wall of the tubular segment into which set screws may be inserted. One or more duplex outlets, circuit breakers and other electrical receptacles are mounted within the box and the operative portions thereof are exposed through apertures formed in the enclosure. A hinged cover panel when swung downward, completely shields the outlet and components, and prevents tampering.

The enclosure, with its base attached, is adapted to be mounted on a stand pipe by inserting the upper end of the stand pipe into the tubular segment until the stand pipe abuts the shoulder formed within the tubular segment of the base plate. The enclosure is affixed to the stand pipe by means of the set screws which pass through the tapped holes in the tubular segment. Because one or more of these set screws is located within the enclosure, it is inaccessible once the assembly is complete which inhibits any attempt to remove the enclosure from the stand pipe.

These and other features of the invention will become apparent to those skilled in the art upon a reading of the following detailed description, considered in conjunction with the accompanying drawing.

BRIEF DESCRIPTION OF THE DRAWING

FIG. 1 illustrates a perspective view of the electric power distribution and metering system of the present invention; and FIG. 2 is a perspective drawing with a portion of the enclosure broken away to expose the internal construction of the system.

DESCRIPTION OF THE PREFERRED EMODIMENT

Referring first to FIG. 1, there is shown a portion of a stand pipe 10 on which the electric power meter and distribution box 12 is mounted. The length of the stand pipe 10 is such that it may go into the ground a predetermined depth to provide a sturdy base while still extending upward to a desired height, taking into consideration snow depth, convenience to the user, and the like. The system of the present invention is designed to be used with underground wiring, and for this purpose, the stand pipe 10 is a hollow tubular member such that the electrical service can be brought up through the stand pipe as is illustrated in FIG. 2. The enclosure 12 includes a base plate 14 which, in the preferred embodiment, is formed from cast aluminum. The base plate 14 has integrally formed therein a tubular portion 16 which extends in both directions from the upper and lower surfaces of the plate 14. Near the upper end of the tubular portion 16 is a shoulder 18 which is of a slightly reduced diameter from that of the tubular portion 16. The inside diameter of the tubular portion 16 is only slightly larger than the outside diameter of the stand pipe 10. Hence, the tubular member 16 of the base plate 14 may be slipped onto the stand pipe 10 and the shoulder 18 serves as a stop which abuts the end of the stand pipe 10.

Affixed to the upper surface of the base 14 is a rectangular box-like enclosure 20. In the preferred embodiment, the box 20 is formed from 16-gauge galvanized steel and is therefore quite rugged. The enclosure 20 is affixed to the base plate 14 by screws, rivets, or the like.

Attached to the upper end of the box-like enclosure 20 is a top member 22 which is of approximately the same width as the enclosure 20 but whose length is somewhat greater than the length of the enclosure so that an over-hang exists on each end of the top.

On the rear face of the enclosure 20 is a circular opening (not shown) which is adapted to accept a standard electric meter 24. In most instances, the meter is owned by the utility company and is supplied when the user is ready to utilize the service.

On the front surface 26 of the enclosure 20 are located a number of apertures into which may be mounted electrical outlets. More specifically, there is shown at 28 a standard duplex outlet along with a pair of three-wire outlets 30. While only a single duplex outlet 28 and two three-wire outlets 30 are illustrated, it should be understood that additional outlets or receptacles can be provided depending upon need.

Mounted connection above the aforementioned outlets is a circuit breaker panel 32. The circuit breaker switches 34 are mounted on this panel and are wired in a conventional manner to the various outlets so as to provide over-current protection.

Contained within the enclosure 20 is a barrier panel 36 which separates the incoming electrical power leads 38 from the circuit breaker switches and associated outlets. Thus, the barrier 36 serves to isolate the power leads from the load connections.

Hinged to the portion of the top 22 which extends outwardly from the side 26 is a cover member 40. In FIG. 1, the cover 40 is shown in its raised position in which the circuit breaker switches 34 and the various electrical outlets 28 and 30 are accessible. When the cover member 40 is swung downwardly about the hinge 42, the circuit breaker switches and various outlets are completely enclosed. Suitable gaskets (not shown) are provided in the cover member 40 to make the assembly water tight when the cover member 40 is in its down position and secured by a lock which passes through the hasp 44.

To eliminate the possibility of theft of the unit, the present invention incorporates a novel arrangement for securing the base 14 to the stand pipe 10. More specifically, there is provided in the cylindrical portion 16 of the base plate 14, a plurality of tapped holes into which set screws 46 and 48 may be inserted. Because the set screw 46 is above the top surface of the base plate 14, it is totally within the enclosure 12 and therefore inaccessible from outside of the enclosure. During installation, access to the internally located set screw 46 is through the meter opening in the rear face of the enclosure. Once the set screw 46 is screwed into place and the electric company's meter is installed in the appropriate aperture, the enclosure 12 cannot be removed from the stand pipe 10 without destroying the unit or breaking the utility company's seal and removing the meter.

The set screw 48 is accessible from outside of the enclosure and is provided to give additional support as well as an effective grounding connection between the stand pipe 10 and enclosure 12.

Outgoing power from the distribution and metering system of this invention may be through a plug outlet and cord 50, or it may be carried through 1-½ inch conduit 52 which passes through a knock-out 54 in the base 14 and runs underground to the mobile home dwelling.

By way of example, and with no limitations intended, typical dimensions for the preferred embodiment may be as follows:

| | |
|---|---|
| Length | 8-¼ inches |
| Width | 10 inches |
| Height | 24-½ inches |
| Length of top | 16-¼ inches |
| Length of cover | 14-¼ inches |
| Diameter of stand | 3 inches |

Obviously, various modifications of the invention are possible in light of the above teachings without departing from the spirit and scope of the invention. It is therefore to be understood that the invention is not limited to the particular form illustrated, but is capable of embodiment in other forms within the scope of the appended claims.

I claim:

1. An electric power distribution and metering system, comprising:
   a. a rectangular base plate having a tubular segment formed integrally therein and extending axially from the top and bottom surface of said plate;
   b. a box-like enclosure of rectangular cross-section affixed to said base plate;
   c. at least one electrical outlet and circuit breaker affixed to one side of said box-like enclosure and having the operating portions thereof extending through apertures formed in said one side;
   d. an opening formed in a second side of said enclosure having means provided for receiving an electrical power meter;
   e. a lockable hinged drop shield, swingingly movable with respect to said one side of said enclosure for covering said operating portions; and
   f. said tubular segment including a generally upstanding tubular female pipe receiving socket disposed within said enclosure and having a bore formed therewithin for receiving a tubular stand pipe therewithin, said tubular female socket having at least one set screw extending through the wall thereof and being located within said enclosure to lockably secure said base plate to a tubular stand pipe upon insertion of said stand pipe into said tubular segment in said base plate.

2. Apparatus as in claim 1 wherein an electrical power meter is lockingly received in said enclosure, and wherein said set screw is disposed within said box-like enclosure and extending from said tubular segment and in an axial direction toward said second side of said enclosure so as to become inaccessible with said electrical power meter inserted into said opening formed in said second side.

3. Apparatus as in claim 2 and further including a barrier plate disposed within said enclosure and being spaced and removed from said rectangular base plate for isolating incoming power leads from said electrical outlet and circuit breaker.

* * * * *